United States Patent
Wang et al.

(10) Patent No.: US 11,505,664 B2
(45) Date of Patent: Nov. 22, 2022

(54) THERMOPLASTIC POLYMER-BASED COMPOSITE MATERIAL AND PREPARATION METHOD THEREOF

(71) Applicants: Changzhou Bamstone Composites Co., Ltd., Changzhou (CN); Wuhan University of Technology, Wuhan (CN)

(72) Inventors: Jun Wang, Wuhan (CN); Junjie Zou, Wuhan (CN); Xiaoli Yang, Wuhan (CN); Wei Liu, Changzhou (CN)

(73) Assignees: CHANGZHOU BAMSTONE COMPOSITES CO., LTD., Changzhou (CN); WUHAN UNIVERSITY OF TECHNOLOGY, Wuhan (CN)

( * ) Notice: Subject to any disclaimer, the term of this patent is extended or adjusted under 35 U.S.C. 154(b) by 480 days.

(21) Appl. No.: 16/645,495

(22) PCT Filed: Nov. 16, 2018

(86) PCT No.: PCT/CN2018/115981
§ 371 (c)(1),
(2) Date: Mar. 9, 2020

(87) PCT Pub. No.: WO2020/093438
PCT Pub. Date: May 14, 2020

(65) Prior Publication Data
US 2021/0221968 A1    Jul. 22, 2021

(30) Foreign Application Priority Data
Nov. 7, 2018 (CN) .......................... 201811322013.5

(51) Int. Cl.
| | |
|---|---|
| C08J 5/24 | (2006.01) |
| C08J 3/24 | (2006.01) |
| C08L 63/00 | (2006.01) |
| C08G 59/50 | (2006.01) |
| C08J 5/04 | (2006.01) |
| C08G 73/12 | (2006.01) |

(52) U.S. Cl.
CPC .............. *C08J 5/24* (2013.01); *C08G 59/50* (2013.01); *C08G 73/121* (2013.01); *C08J 3/246* (2013.01); *C08J 5/043* (2013.01); *C08J 5/244* (2021.05); *C08L 63/00* (2013.01); *C08J 2363/00* (2013.01); *C08J 2479/08* (2013.01)

(58) Field of Classification Search
CPC ................ C08J 2379/08; C08J 2479/08; C08J 2463/00–10; C08J 2363/00–10; C08J 5/24; C08G 59/00–72; C08G 73/12–127; C08L 79/08; C08L 63/00–10; C09D 163/00–10; C09J 163/00–10
See application file for complete search history.

(56) References Cited

U.S. PATENT DOCUMENTS

| | | | | |
|---|---|---|---|---|
| 4,128,598 A | * | 12/1978 | Makino .............. | C08G 59/4042 528/102 |
| 5,093,459 A | * | 3/1992 | Peter .................. | C08G 59/4042 528/170 |
| 5,470,920 A | | 11/1995 | Camberlin et al. | |

FOREIGN PATENT DOCUMENTS

| | | | |
|---|---|---|---|
| CN | 1775513 | A | 5/2006 |
| CN | 1844194 | A | 10/2006 |
| CN | 105906749 | A | 8/2016 |
| CN | 106117514 | A | 11/2016 |
| CN | 108587162 | A | 9/2018 |
| DE | 2512280 | A1 * | 9/1975 |
| JP | 51019100 | A * | 2/1976 |
| JP | 2015004020 | A | 1/2015 |

OTHER PUBLICATIONS

Patel et al., "Amine-Terminated Oligoimides for Epoxy Curing," J. Appl. Polym. Sci. 61, 2023-2028 (1996).*

* cited by examiner

*Primary Examiner* — Kregg T Brooks
(74) *Attorney, Agent, or Firm* — Bayramoglu Law Offices LLC

(57) ABSTRACT

A thermoplastic polymer-based composite material and a preparation method thereof are provided. The thermoplastic polymer-based composite material is obtained by impregnating a reinforcing material with a mixture or oligomer of an epoxy resin, a bismaleimide resin, and a bifunctional amine (calculated based on active hydrogen), and then performing an in-situ polymerization. The thermoplastic polymer-based composite material has excellent impregnation effect, excellent secondary processing performance, relatively high heat resistance, excellent flame retardancy, and mechanical properties, and excellent comprehensive performance.

14 Claims, No Drawings

THERMOPLASTIC POLYMER-BASED COMPOSITE MATERIAL AND PREPARATION METHOD THEREOF

CROSS REFERENCE TO THE RELATED APPLICATIONS

This application is the national phase entry of International Application No. PCT/CN2018/115981, filed on Nov. 16, 2018, which is based upon and claims priority to Chinese Patent Application No. 201811322013.5, filed on Nov. 7, 2018, the entire contents of which are incorporated herein by reference.

TECHNICAL FIELD

The present disclosure relates to a thermoplastic polymer-based composite material and a preparation method thereof, and belongs to the technical field of polymer-based composite materials.

BACKGROUND

Polymer-based composite materials have been widely used in aerospace, marine, automotive and other fields. According to their different resin matrix, the polymer-based composite materials can be divided into thermosetting composite materials and thermoplastic composite materials. In the past half century, thermosetting resin matrix composite materials have been widely recognized by the engineering community as a novel material, and have entered the stage of industrial production with rapid growth at a relatively high rate. However, thermosetting composite materials still have some drawbacks, such as long curing time, high volatile organic compounds (VOC) emissions, low impact resistance, damage resistance, etc. Currently, there is extreme concern about the increasingly serious environmental pollution caused by waste and harmful gases. In developed countries such as European countries and the United States, composite material manufacturers have been required to recycle thermosetting composite material waste and limit the emissions of harmful gases during the molding process of thermosetting composite materials. Thermoplastic composites have attracted widespread attention in the field of composite materials because of their unique advantages such as short molding times, recyclable wastes, and other benefits.

At present, the main manufacturing methods of thermoplastic composite materials are the hot-melt method and the solvent method. The hot-melt method includes melting the thermoplastic resin into a viscous liquid by heating and then impregnating the fibers. However, thermoplastic polymer materials all have relatively high melt viscosity and melting temperature, resulting in certain difficulties in fiber impregnation, processing, and forming of thermoplastic composite materials. The solvent method includes dissolving a resin into a solution with an appropriate solvent and then impregnating the fibers, followed by removing the solvent by heating and evaporation. However, the solvent method has high costs and VOC emissions, and residual solvents will affect the properties of composite materials. Therefore, the preparation of thermoplastic polymer-based composite materials by in-situ polymerization has received increasing attention.

Chinese patent CN200510110969 discloses a method for preparing fiber-reinforced acrylonitrile-butadiene-styrene (ABS) by in-situ polymerization. Chinese patent CN201610382346 discloses a method for preparing fiber-reinforced polyolefin and poly(methyl methacrylate) (PMMA) by in-situ polymerization. Chinese patent CN200610040172 discloses a method for preparing thermoplastic polyurethane (TPU)/a nylon 6 composite material by in-situ polycondensation. In the above-mentioned methods, the thermoplastic composite material is prepared by in-situ polymerization based on existing common thermoplastic matrixes, which can overcome some of the drawbacks of the traditional melting method and solvent method. However, the interface properties of the prepared composite materials have not received much attention.

Chinese patent CN106117514A discloses a thermoplastic composite material and a preparation method thereof. The thermoplastic composite material is prepared by in-situ polymerization after impregnating a fiber with a mixture of a monofunctional primary amine/bifunctional secondary amine and an epoxy resin. Although this method solves the interface problem, the composite material prepared by general epoxy resin has low heat resistance, with a glass transition temperature of 50-65° C., which will soften and deform at a relatively low temperature and has a low practical value.

Although the traditional thermosetting composite materials have the advantages of high heat resistance and high strength, they also have the disadvantages of insufficient environmental friendliness, limited production processes, non-recyclability, and other problems. Thermoplastic composites have the advantages of high forming speed, no VOC emissions, environmental friendliness, and good recyclability, but still have disadvantages such as insufficient resin infiltration to fibers, insufficient heat resistance, and other problems. Conventional hot-melt methods for producing thermoplastic composite materials have poor impregnation effect and require a high temperature. The solvent method consumes a large amount of organic solvents, which is prone to cause environmental pollution. The emerging in-situ polymerization method has drawbacks in terms of interface, raw material selection, and heat resistance. Therefore, there is an urgent to develop a thermoplastic composite material with excellent overall properties.

SUMMARY

In view of the above-mentioned problems, the present disclosure provides a thermoplastic polymer-based composite material and a preparation method thereof. The composite material with excellent overall properties is prepared by comprehensively utilizing the characteristics of the interface adhesion of epoxy resin, heat resistance and flame retardancy of a bismaleimide resin, and the low viscosity of the mixture.

To achieve the above-mentioned objectives, the following technical solutions are used.

A thermoplastic polymer-based composite material is obtained by an in-situ polymerization reaction after impregnating a reinforcing material with a mixture or oligomer of a bismaleimide resin, an epoxy resin, and a bifunctional amine; a ratio of the bismaleimide resin, the epoxy resin, and the bifunctional amine is calculated according to the following formula:

$$M_H/(M_M+M_E)=1.0\text{-}1.5$$

wherein, $M_H$ is an amount of active hydrogen functional groups (in mol), $M_M$ is an amount of maleimide functional groups (in mol), and $M_E$ is an amount of epoxy functional groups (in mol).

Preferably, the epoxy resin is one or a combination of the following general structural formula:

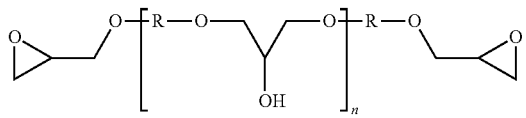

wherein, R is a $C_2$-$C_{18}$ alkyl, an aryl, a cycloalkyl group, a bisphenol A structure, a bisphenol F structure, a bisphenol S structure, a halogenated bisphenol A structure, a halogenated bisphenol F structure, a halogenated bisphenol S structure, a hydrogenated bisphenol A structure, a hydrogenated bisphenol F structure, or a hydrogenated bisphenol S structure; and n is 0-20.

Preferably, the reinforcing material includes but is not limited to one or a combination of glass fiber, carbon fiber, aramid fiber, Kevlar fiber, basalt fiber, poly (p-phenylenebenzobisoxazole) (PBO) fiber, nylon fiber, ultra-high molecular weight polyethylene (UHMWPE) fiber, polyimide fiber, and polyester fiber.

A method for preparing the above-mentioned thermoplastic polymer-based composite material, including the following steps:

(1) mixing the epoxy resin and the bismaleimide resin according to the ratio, then adding the bifunctional amine according to the ratio, and stirring evenly, wherein, a small amount of a multifunctional epoxy resin or a multifunctional amine is selectively added to form a branched or lightly crosslinked polymer, and an additional amount limited for controlling a cross-linking density without reaching the gel point, and controlling a polymerization product to be a soluble, fusible thermoplastic polymer; and (2) impregnating the reinforcing material with the mixture prepared in step (1); after the impregnation is completed, performing an in-situ polymerization to obtain the thermoplastic polymer-based composite material; if a polymerization time needs to be shortened, appropriate heating is selectively performed to increase the reaction rate; and a temperature in the in-situ polymerization ranges from room temperature to 200° C.

Preferably, in step (1), the epoxy resin and the bismaleimide resin are brought to 60° C.-150° C. for the duration of mixing, and after the mixing is completed, the temperature is reduced to room temperature (15-35° C.), and then the bifunctional amine is added according to the ratio.

In addition, the thermoplastic polymer-based composite material prepared in step (2) can be subjected to secondary processing after a secondary heating and softening.

Compared with the prior art, the advantages of the present invention are as follows.

In the present invention, the characteristic that both the bismaleimide resin and the epoxy resin can chemically react with the active hydrogen of the amine is utilized to allow the bismaleimide resin and the epoxy resin to co-polymerize into a thermoplastic polymer. The typical reaction is shown in the following reaction formula:

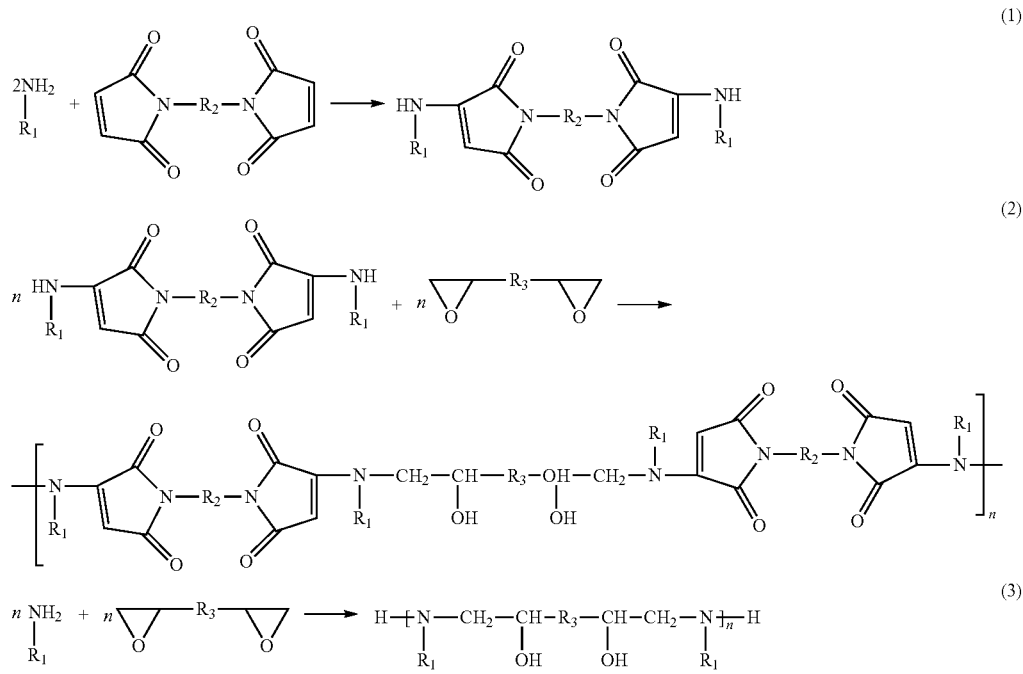

wherein, R1 and R2 are each an aryl or aralkyl group, and R3 is a structure of an inactive portion of the epoxy resin.

Therefore, in the present invention, the prepared composite material has excellent overall properties by comprehensively utilizing characteristics such as the interface adhesion of the epoxy resin, heat resistance of the bismaleimide resin, and low viscosity of the mixture. Specifically, compared with the thermoplastic composite material described in CN106117514, heat resistance and flame retardancy of the composite material of the present invention are improved on the premise of maintaining the advantages of "low viscosity, easy to impregnate fibers, and good interface performance", so that the composite material of the present invention has a wider practical use.

DETAILED DESCRIPTION OF THE EMBODIMENTS

To better understand the present invention, the content of the present invention is further clarified below with reference to the embodiments, understanding that these are only typical embodiments of the invention and are therefore not to be considered to be limiting of the scope of the invention.

Embodiment 1

10 g of 4,4'-bismaleimido-diphenylmethane (BDM) and 90 g of bisphenol-A epoxy resin (EEW (Epoxy Equivalent Weight)=185-195, purchased from Nantong Xingchen Synthetic Material Co., Ltd.) are weighed accurately, added into a beaker, heated in an oil bath to 120° C., and stirred while heating, followed by cooling to room temperature after fully mixing. Subsequently, 24 g of aniline is added, and stirring evenly is continued to form a low-viscosity mixture for subsequent use.

Nine pieces of 15 cm×15 cm glass fiber cloth are cut and spread on the glass plate. The above-mentioned low-viscosity mixture is evenly coated on the glass fiber cloth with a brush and to impregnate the glass fiber cloth. The impregnated glass fiber cloth is first placed at room temperature for 0.5 hours, and then placed in an oven at 120° C. for 2 hours to perform in-situ polymerization to obtain 9 composite prepreg sheets.

The 9 composite prepreg sheets are stacked together and put into a mold of a hot press. The mold temperature is 180° C. After hot pressing is performed for 5 minutes, the composite prepreg sheets are taken out, and cooled to obtain a thermoplastic composite material laminate.

The glass transition temperature of the thermoplastic composite material laminate is determined to be 85.8° C., and the oxygen index thereof is determined to be 30.

Embodiment 2

Conditions are consistent with Embodiment 1 except that the amount of 4,4'-bismaleimido-diphenylmethane (BDM) is changed to 15 g, and the amount of bisphenol-A epoxy resin is changed to 85 g. The glass transition temperature is determined to be 92.2° C., and the oxygen index is determined to be 32.

Embodiment 3

Conditions are consistent with Embodiment 1 except that the amount of 4,4'-bismaleimido-diphenylmethane (BDM) is changed to 20 g, and the amount of bisphenol-A epoxy resin is changed to 80 g. The glass transition temperature is determined to be 105.7° C., and the oxygen index is determined to be 34.

Comparative Embodiment

Conditions are consistent with Embodiment 1 except that the 4,4'-bismaleimido-diphenylmethane (BDM) is deleted, and the amount of bisphenol-A epoxy resin is changed to 100 g. The glass transition temperature is determined to be 62.0° C., and the oxygen index is determined to be 26.

Statistical results of the above Embodiments and the Comparative Embodiment are shown in the following table:

| Name | BDM (g) | Bisphenol-A epoxy resin (g) | Tg (glass transition temperature, ° C.) | Oxygen index |
|---|---|---|---|---|
| Comparative Embodiment | 0 | 100 | 62 | 26 |
| Embodiment 1 | 10 | 90 | 85.8 | 30 |
| Embodiment 2 | 15 | 85 | 92.2 | 32 |
| Embodiment 3 | 20 | 80 | 105.7 | 34 |

As can be seen from the table, with the increase of the amount of bismaleimide resin, the heat resistance and flame retardancy of the composite materials are simultaneously improved. A thermoplastic polymer-based composite material with excellent overall properties can be obtained by using the present invention.

Embodiment 4

Conditions are consistent with Embodiment 1 except that 24 g of aniline is replaced with 27.5 g of toluidine. The glass transition temperature is determined to be 85.2° C.

Embodiment 5

Conditions are consistent with Embodiment 1 except that 24 g of aniline is replaced with 27.5 g of benzylamine. The glass transition temperature is tested to be 84.3° C.

Embodiment 6

Conditions are consistent with Embodiment 1 except that 24 g of aniline is replaced with 22 g of piperazine (added after dissolving in ethanol). The glass transition temperature is determined to be 112.6° C.

Embodiments 4, 5 and 6 show that by using different amines, thermoplastic polymer-based composite materials with excellent overall properties similar to that obtained by using aniline can also be obtained.

Embodiment 7

Conditions are consistent with Embodiment 1 except that 90 g of bisphenol-A epoxy resin is replaced with a mixture of 55 g of a tetrabromobisphenol A epoxy resin (EEW=340-360, purchased from Nantong Xingchen Synthetic Material Co., Ltd.) and 35 g of hydroquinone diglycidyl ether (EEW=110-115). The glass transition temperature is determined to be 107.5° C.

Embodiment 8

Conditions are consistent with Embodiment 1 except that 90 g of bisphenol-A epoxy resin is replaced with a mixture of 100 g of a tetrabromobisphenol A epoxy resin (EEW=340-360, purchased from Nantong Xingchen Synthetic Material Co., Ltd.) and 30 g of cyclohexanediol diglycidyl ether (EEW=160-170). The glass transition temperature is determined to be 94.5° C.

Embodiments 7 and 8 show that by using different epoxy resins, thermoplastic polymer-based composite materials with excellent overall properties similar to that obtained by using bisphenol-A type epoxy resin can also be obtained.

Embodiment 9

Conditions are consistent with Embodiment 1 except that 10 g of 4,4'-bismaleimido-diphenylmethane (BDM) is replaced with 10 g of 3,3'-dimethyl-4,4'-diphenylmethane bismaleimide. The glass transition temperature is determined to be 85.5° C.

Embodiment 10

Conditions are consistent with Embodiment 1 except that 10 g of 4,4'-bismaleimido-diphenylmethane (BDM) is replaced with 10 g of 3,3'-diethyl-4,4'-diphenylmethane bismaleimide. The glass transition temperature is determined to be 85.9° C.

Embodiments 9 and 10 show that by using different bismaleimide resins, thermoplastic polymer-based composite materials with excellent overall properties similar to that obtained by using 4,4'-diphenylmethane bismaleimide can also be obtained.

Embodiment 11

Conditions are consistent with Embodiment 1 except that 90 g of bisphenol-A epoxy resin is replaced with a mixture of 80 g of a bisphenol-F epoxy resin (NPEF-170, EEW=160-180, purchased from Nanya Epoxy Resin (Kunshan) Co., Ltd.) and 10 g of phenolic epoxy resin (NPPN-631, EEW=168-178, purchased from Nanya Epoxy Resin (Kunshan) Co., Ltd.) to obtain a composite laminate.

The resultant composite laminate is placed in an oven at 280° C. for half an hour, and it is found that the polymer matrix could be melted.

Embodiment 12

Conditions are consistent with Embodiment 1 except that 24 g of aniline is replaced with a mixture of 22 g of aniline and 2 g of N-aminoethyl piperazine to obtain a composite laminate. The glass transition temperature is determined to be 90.2° C.

The resultant composite laminate is placed in an oven at 280° C. for half an hour, and it is found that the polymer matrix can be melted.

Embodiments 11 and 12 show that by adding a small amount of a multifunctional epoxy resin or multifunctional amine, the resultant composite material also has thermoplastic property and improved heat resistance.

What is claimed is:

1. A thermoplastic polymer-based composite material obtained by an in-situ polymerization reaction after impregnating a reinforcing material with a mixture or an oligomer of a bismaleimide resin, an epoxy resin, and a bifunctional amine, the bifunctionality of the amine being on the basis of active hydrogen; wherein a ratio of the bismaleimide resin, the epoxy resin, and the bifunctional amine in the mixture or used to form the oligomer is calculated according to the following formula:

$$M_H/(M_M + M_E) = 1.0 - 1.5$$

wherein, $M_H$ is an amount in mol of active hydrogen functional groups in the bifunctional amine, $M_M$ is an amount in mol of maleimide functional groups, and $M_E$ is an amount in mol of epoxy functional groups.

2. The thermoplastic polymer-based composite material according to claim 1, wherein the epoxy resin is at least one of the following general structural formula:

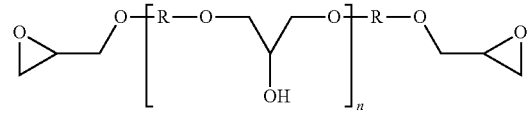

wherein, R is a $C_2$-$C_{18}$ alkyl, an aryl, a cycloalkyl group, a bisphenol A structure, a bisphenol F structure, a bisphenol S structure, a halogenated bisphenol A structure, a halogenated bisphenol F structure, a halogenated bisphenol S structure, a hydrogenated bisphenol A structure, a hydrogenated bisphenol F structure, or a hydrogenated bisphenol S structure; and n is 0-20.

3. The thermoplastic polymer-based composite material according to claim 1, wherein the bismaleimide resin is a bifunctional compound having maleimide as an active terminating group.

4. The thermoplastic polymer-based composite material according to claim 1, wherein the bifunctional amine is-at least one of a pure substance or a mixed substance, and the bifunctional amine has an average functionality of 2 based on active hydrogen.

5. The thermoplastic polymer-based composite material according to claim 1, wherein a predetermined amount of at least one of a multifunctional epoxy resin and a multifunctional amine is added to the mixture or oligomer to form a branched polymer or a lightly crosslinked polymer, and the predetermined amount is determined to control a crosslinking density without reaching a gel point and to control the branched polymer or the lightly crosslinked polymer to be a fusible thermoplastic polymer.

6. The thermoplastic polymer-based composite material according to claim 1, wherein the reinforcing material is at least one selected from the group consisting of glass fiber, carbon fiber, aramid fiber, Kevlar fiber, basalt fiber, poly (p-phenylenebenzobisoxazole) (PBO) fiber, nylon fiber, ultra-high molecular weight polyethylene (UHMWPE) fiber, polyimide fiber, and polyester fiber.

7. A method for preparing the thermoplastic polymer-based composite material according to claim 1, comprising the following steps:
(1) mixing the epoxy resin and the bismaleimide resin according to the ratio to obtain a first mixture, then adding the bifunctional amine to the first mixture according to the ratio to obtain a second mixture, and stirring the second mixture evenly; and
(2) impregnating the reinforcing material with the second mixture prepared in step (1); after the impregnating is completed, performing an in-situ polymerization to obtain the thermoplastic polymer-based composite material.

8. The method for preparing the thermoplastic polymer-based composite material according to claim 7, wherein in step (1), the epoxy resin and the bismaleimide resin are heated to a temperature of 60° C.-150° C. during the mixing, and after the mixing is completed, the temperature is reduced to room temperature of 15° C.-35° C., and then the bifunctional amine is added according to the ratio.

9. The method for preparing the thermoplastic polymer-based composite material according to claim 7, wherein a temperature of the in-situ polymerization is 15° C.-200° C.

10. The method for preparing the thermoplastic polymer-based composite material according to claim 7, wherein the epoxy resin is at least one of the following general structural formula:

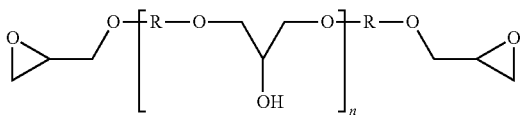

wherein, R is a $C_2$-$C_{18}$ alkyl, an aryl, a cycloalkyl group, a bisphenol A structure, a bisphenol F structure, a bisphenol S structure, a halogenated bisphenol A structure, a halogenated bisphenol F structure, a halogenated bisphenol S structure, a hydrogenated bisphenol A structure, a hydrogenated bisphenol F structure, or a hydrogenated bisphenol S structure; and n is 0-20.

11. The method for preparing the thermoplastic polymer-based composite material according to claim 7, wherein the bismaleimide resin is a bifunctional compound having maleimide as an active terminating group.

12. The method for preparing the thermoplastic polymer-based composite material according to claim 7, wherein the bifunctional amine is at least one of a pure substance or a mixed substance, and the bifunctional amine has an average functionality of 2 based on active hydrogen.

13. The method for preparing the thermoplastic polymer-based composite material according to claim 7, wherein a predetermined amount of at least one of a multifunctional epoxy resin and a multifunctional amine is added to the first or second mixture to form a branched polymer or a lightly crosslinked polymer, and the predetermined amount is determined to control a cross-linking density without reaching a gel point and to control the branched polymer or the lightly crosslinked polymer to be a fusible thermoplastic polymer.

14. The method for preparing the thermoplastic polymer-based composite material according to claim 7, wherein the reinforcing material is at least one selected from the group consisting of glass fiber, carbon fiber, aramid fiber, Kevlar fiber, basalt fiber, poly (p-phenylenebenzobisoxazole) (PBO) fiber, nylon fiber, ultra-high molecular weight polyethylene (UHMWPE) fiber, polyimide fiber, and polyester fiber.

* * * * *